United States Patent
Jin et al.

(10) Patent No.: US 9,184,878 B2
(45) Date of Patent: Nov. 10, 2015

(54) NON-DISRUPTIVE NETWORK NOISE MEASUREMENT

(71) Applicant: Cisco Technology, Inc., San Jose, CA (US)

(72) Inventors: Hang Jin, Plano, TX (US); Koen Van Renterghem, Lovendegem (BE); Richard Meller, Sunnyvale, CA (US); Denis Downey, Pleasanton, CA (US); Glendon L. Akins, III, Ft. Collins, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/317,400

(22) Filed: Jun. 27, 2014

(65) Prior Publication Data

US 2015/0110205 A1  Apr. 23, 2015

Related U.S. Application Data

(63) Continuation-in-part of application No. 14/056,300, filed on Oct. 17, 2013.

(51) Int. Cl.
*H04L 1/00* (2006.01)
*H04L 27/00* (2006.01)

(52) U.S. Cl.
CPC .......... *H04L 1/0054* (2013.01); *H04L 27/0002* (2013.01)

(58) Field of Classification Search
CPC ... H04L 1/005; H04L 1/0054; H04L 27/0002; H04L 1/0057; H04L 1/0059; H04L 1/0065; H04L 1/0071; H04L 25/0224; H04L 2025/03426; H04L 25/0226; H04L 25/0232; H04L 25/0242; H04L 27/0008; H04L 5/00; H04L 1/004; H04L 27/261; H04L 1/0048; H04L 25/0204
See application file for complete search history.

(56) References Cited

U.S. PATENT DOCUMENTS

| | | | |
|---|---|---|---|
| 7,570,722 B1 | 8/2009 | Lee et al. | |
| 8,543,894 B1 * | 9/2013 | Varnica et al. | 714/794 |
| 2002/0172266 A1 | 11/2002 | Abraham et al. | |
| 2008/0025442 A1 * | 1/2008 | Hwang et al. | 375/346 |
| 2008/0239094 A1 | 10/2008 | Baqai et al. | |
| 2011/0154145 A1 * | 6/2011 | Lomnitz | 714/749 |
| 2012/0057484 A1 * | 3/2012 | Wan et al. | 370/252 |
| 2012/0082274 A1 * | 4/2012 | Bury | 375/346 |
| 2012/0195399 A1 * | 8/2012 | Zhu et al. | 375/341 |
| 2013/0051444 A1 * | 2/2013 | Roh | 375/222 |
| 2013/0188761 A1 * | 7/2013 | Heikkila | 375/349 |
| 2014/0153625 A1 * | 6/2014 | Vojcic et al. | 375/224 |
| 2014/0169436 A1 * | 6/2014 | Hadani et al. | 375/232 |

* cited by examiner

*Primary Examiner* — Hirdepal Singh
(74) *Attorney, Agent, or Firm* — Edell, Shapiro & Finnan, LLC

(57) ABSTRACT

Presented herein are non-disruptive noise estimation techniques that utilize a correlation between attributes of a received signal and the noise to generate estimated noise values for symbols of the signal. More specifically, a digital signal comprising symbols transmitted over a telecommunications network is received. For each of a plurality of the symbols, an estimated noise value associated with the respective symbol is generated through a correlation of a log-likelihood ratio (LLR) value to predetermined noise values. The estimated noise values for the plurality of symbols are used to generate noise information representing time and frequency characteristics of noise in the telecommunications network.

24 Claims, 19 Drawing Sheets

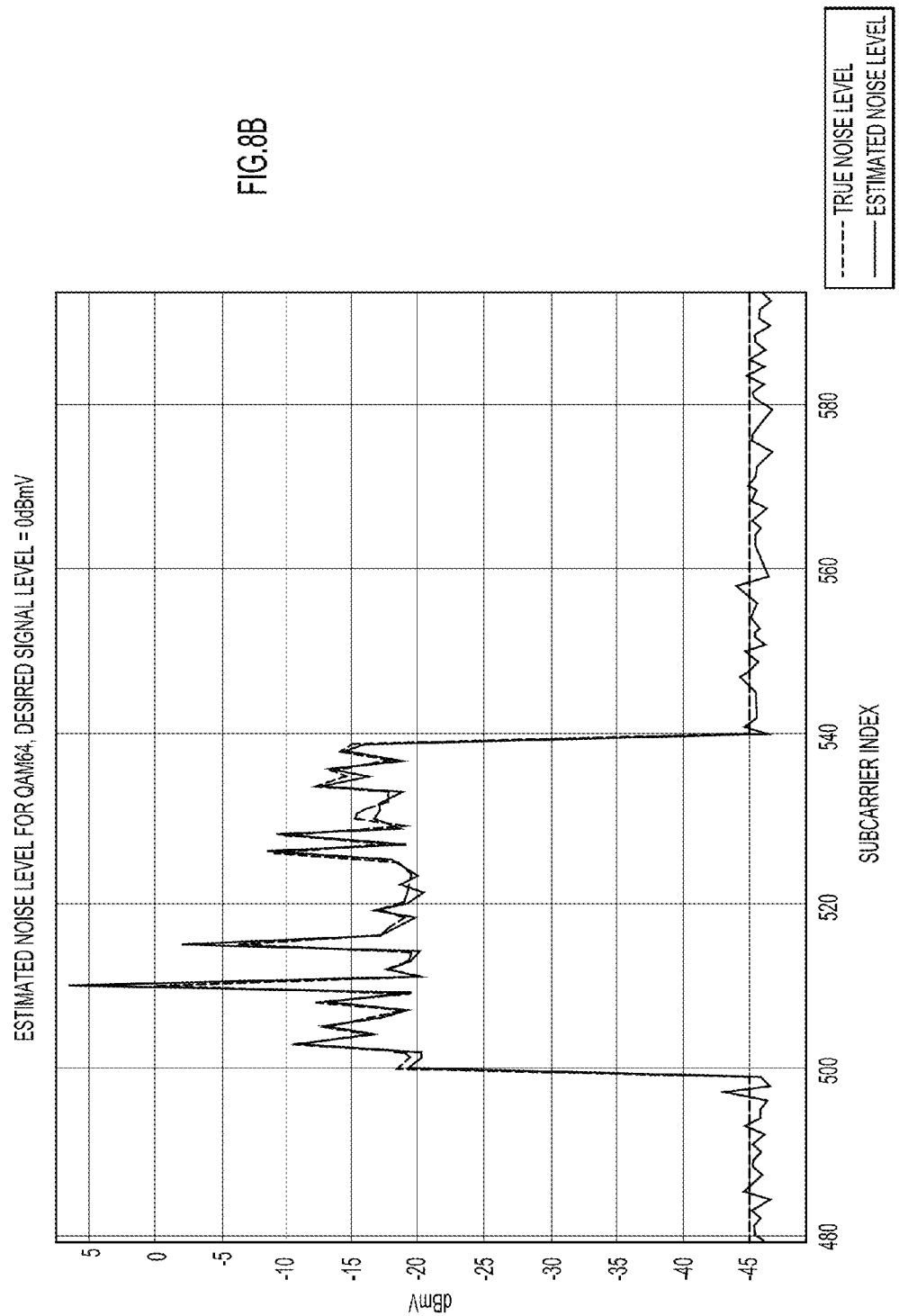

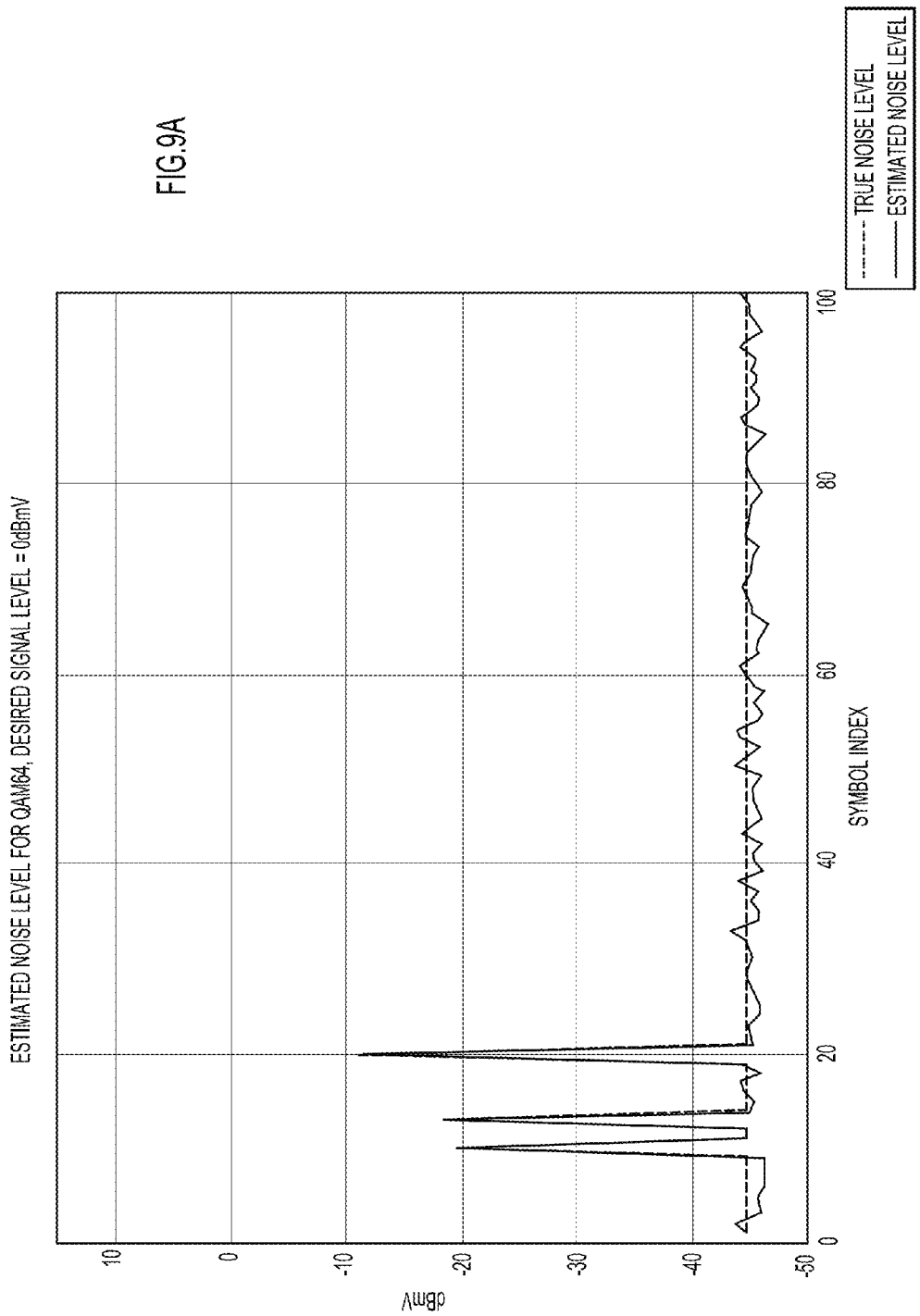

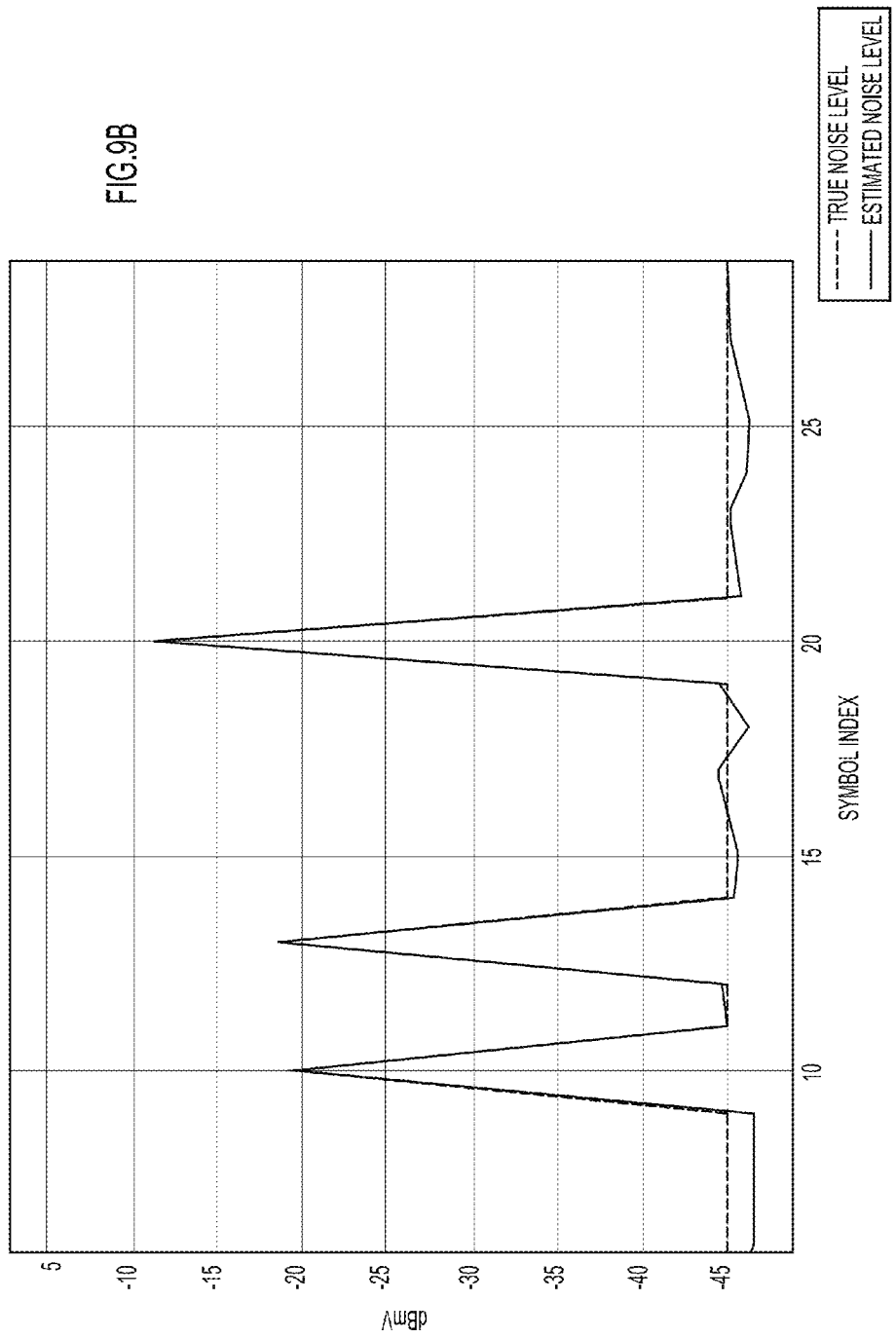

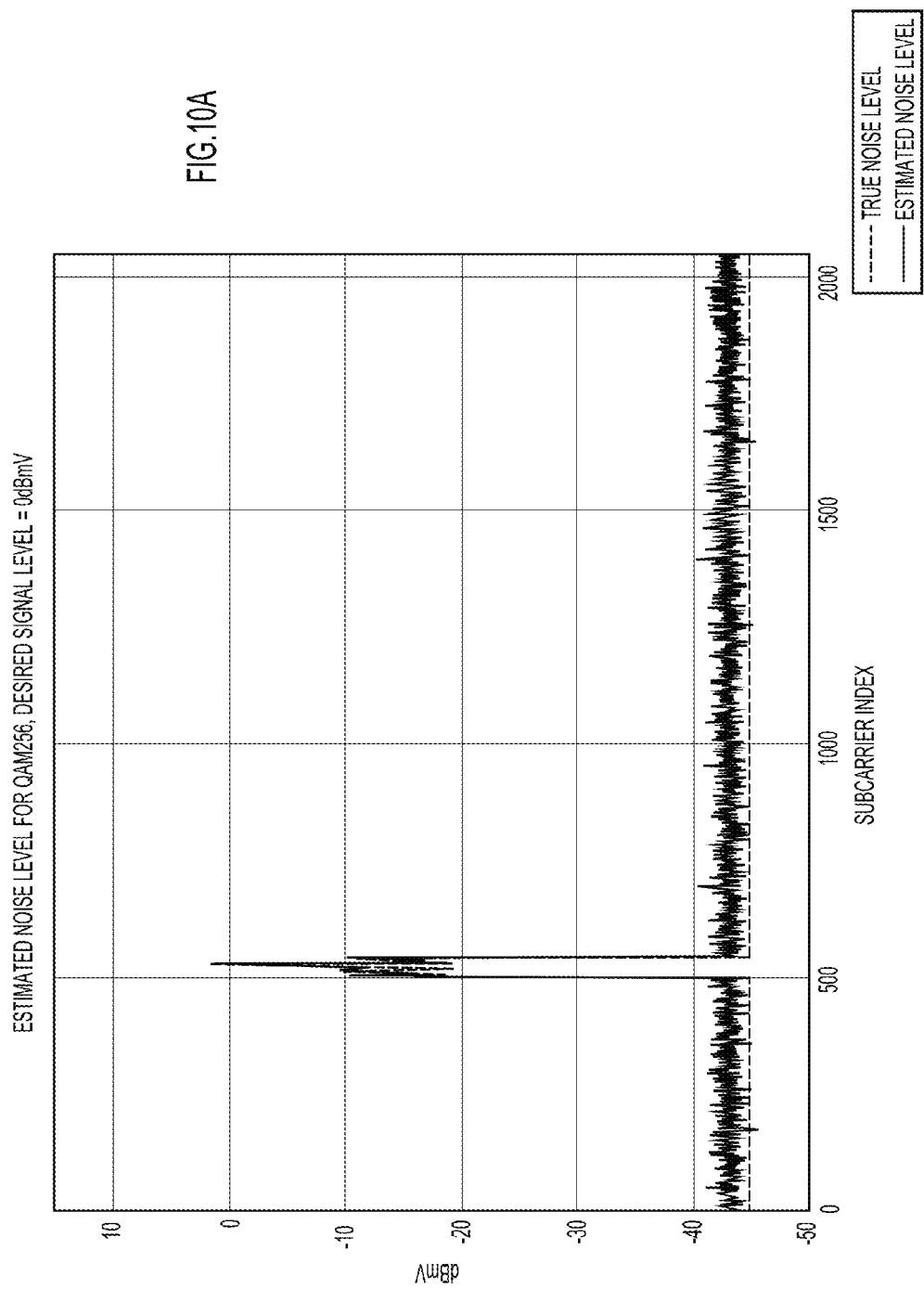

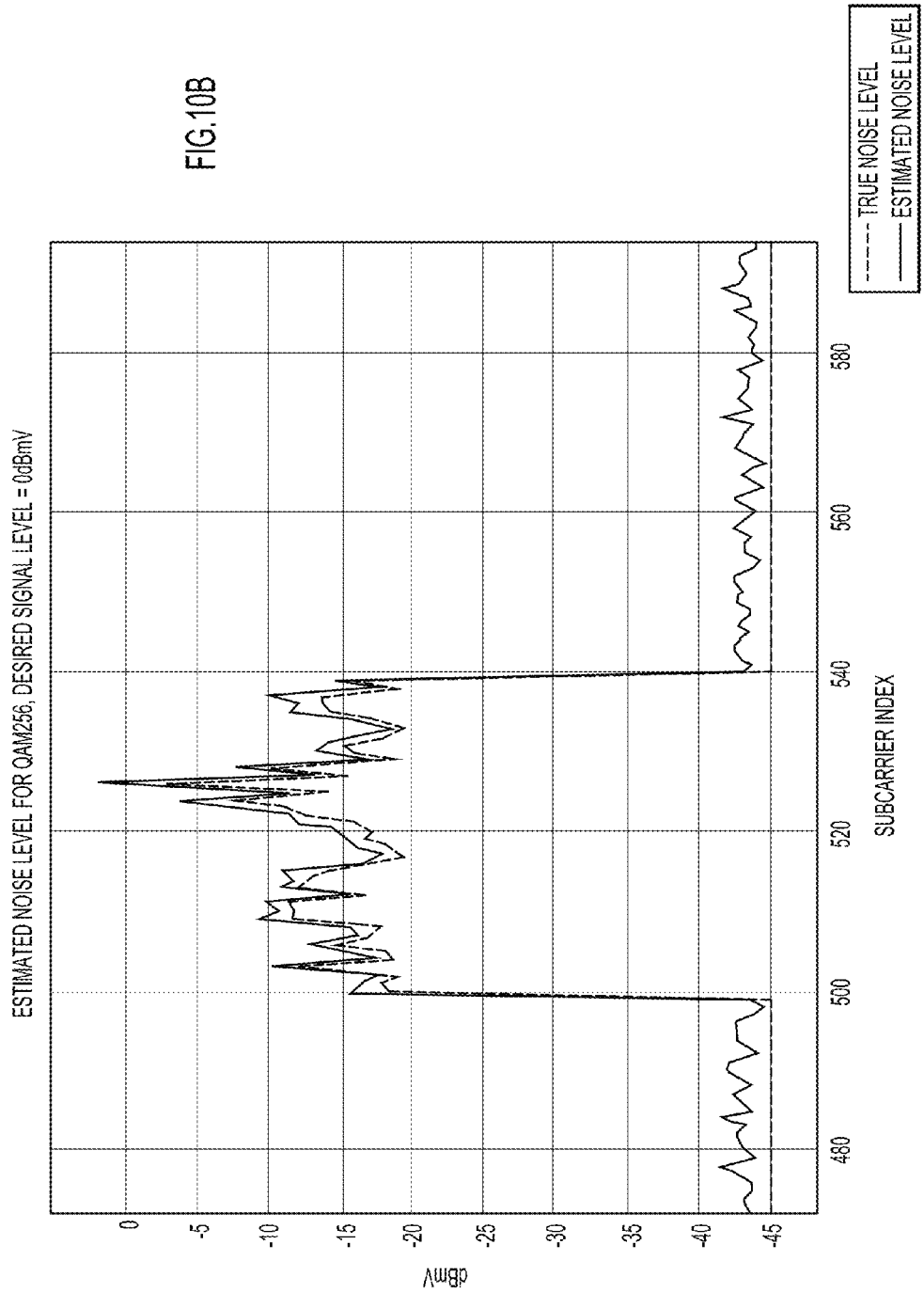

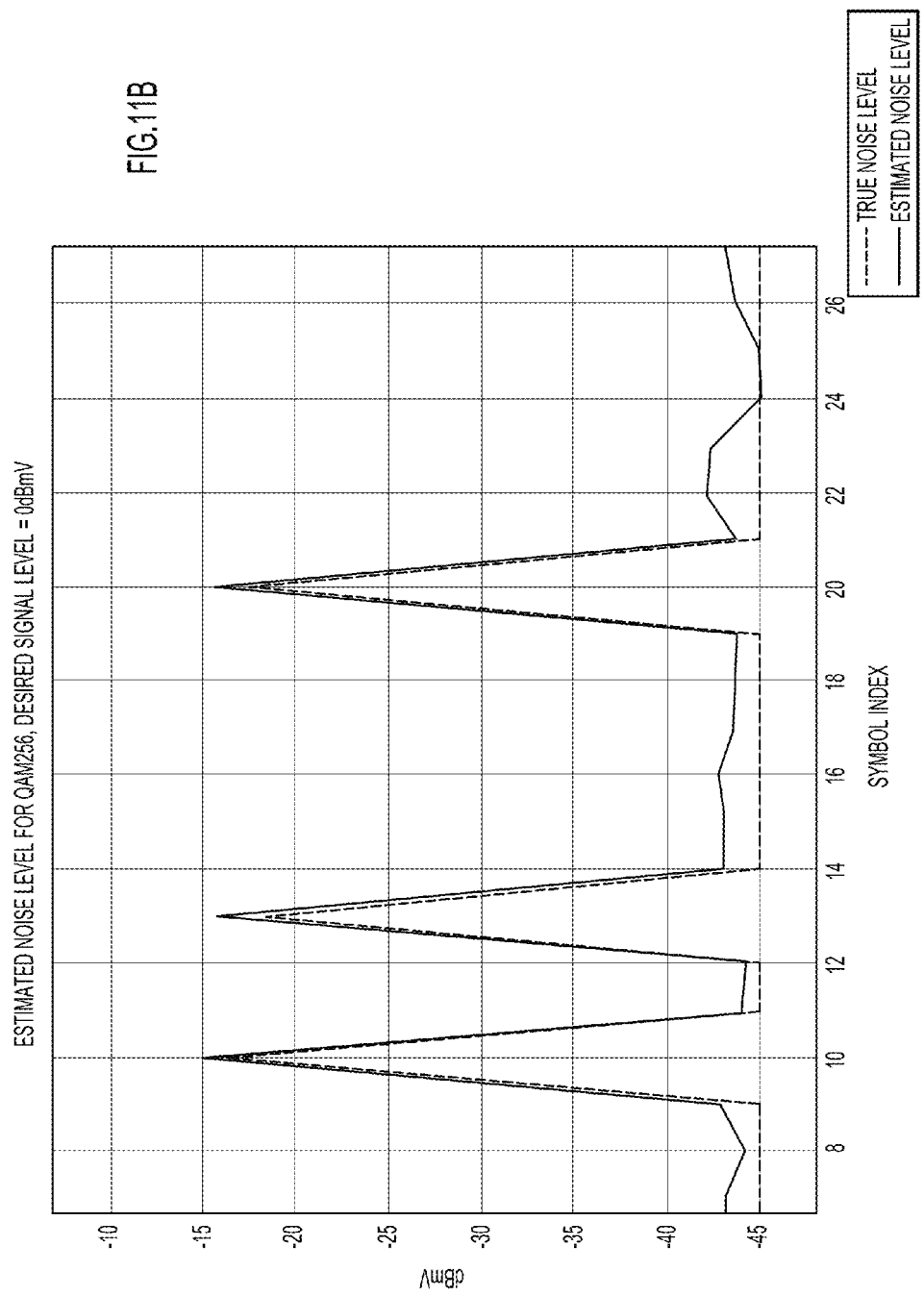

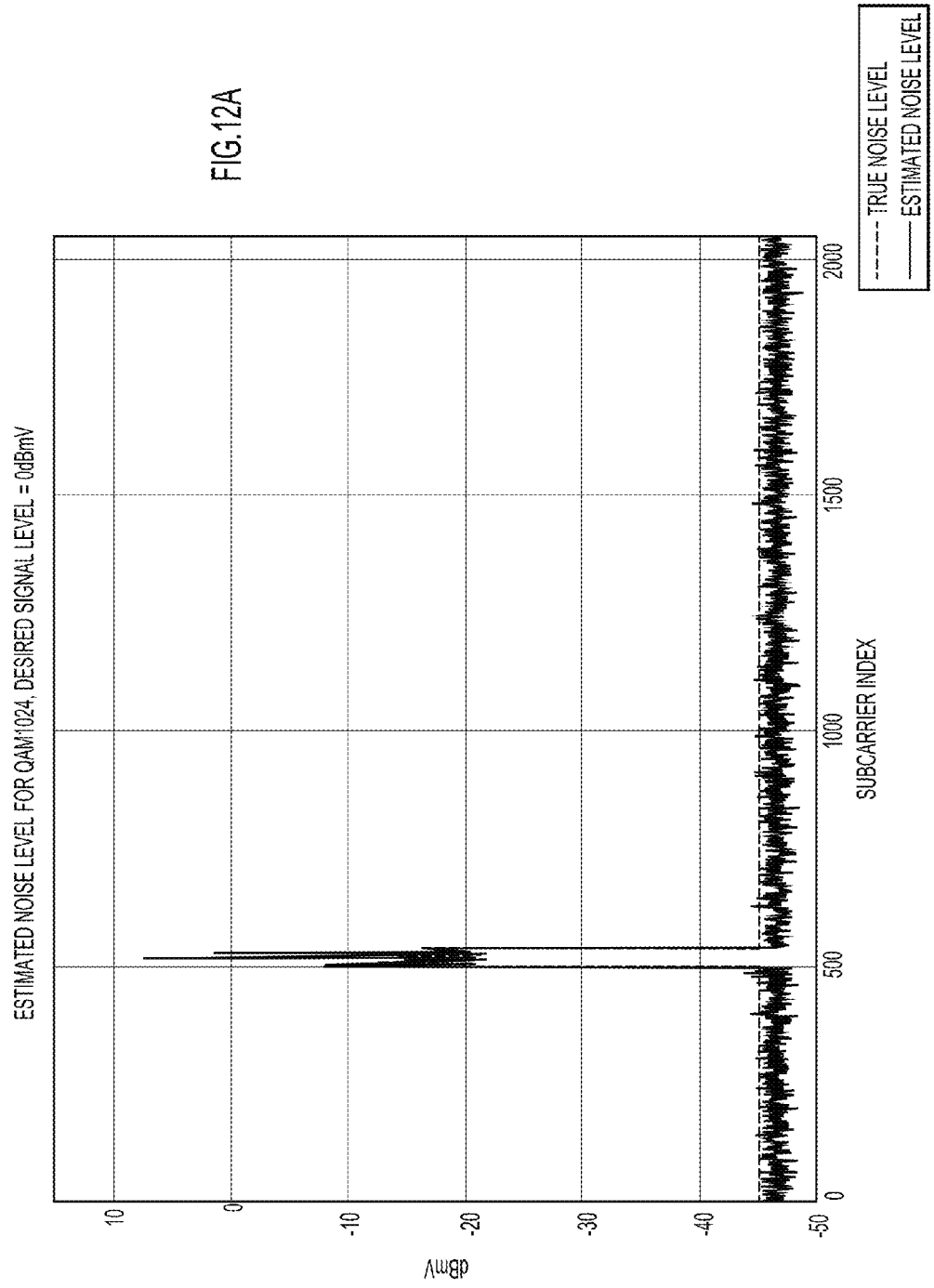

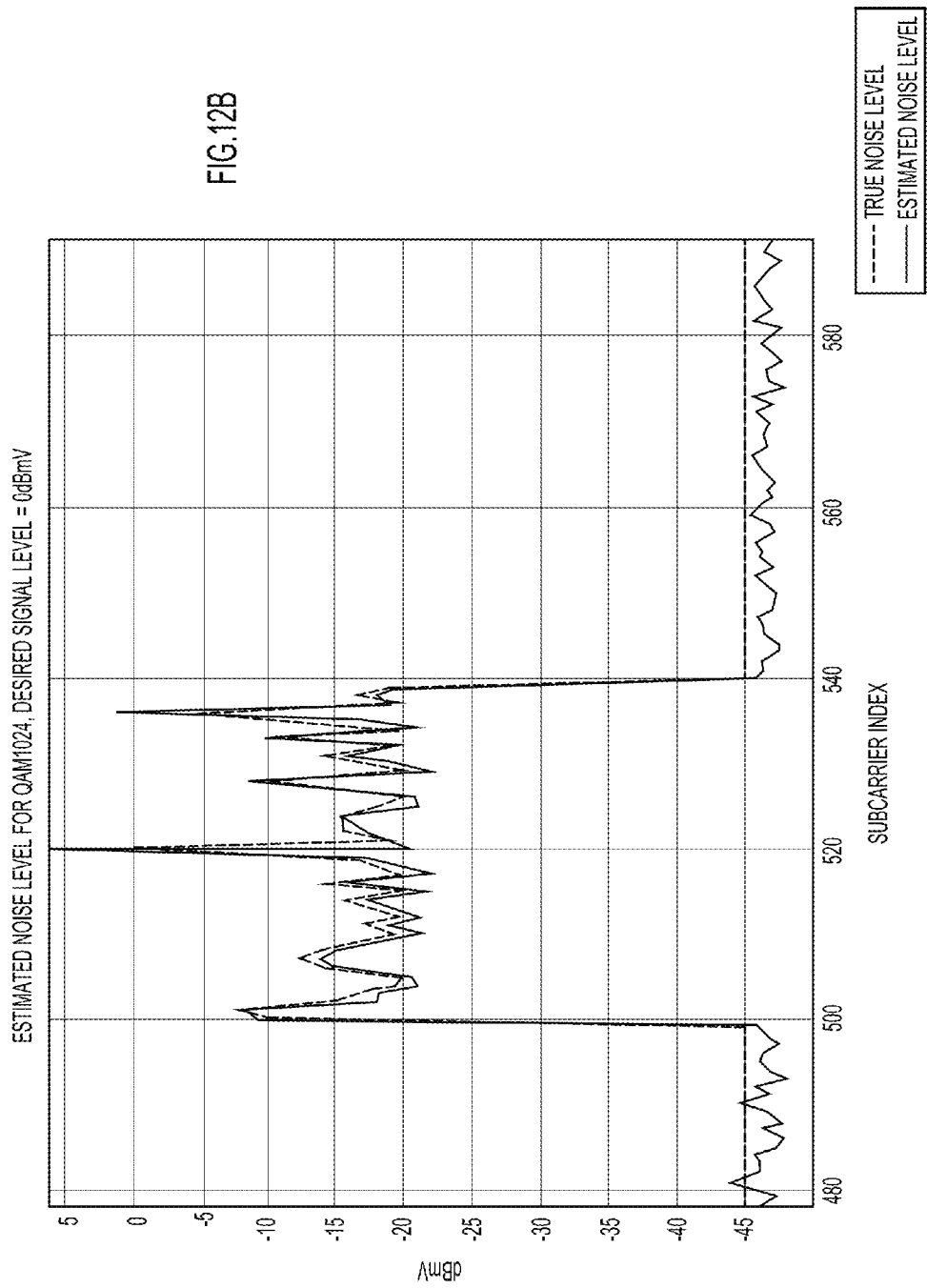

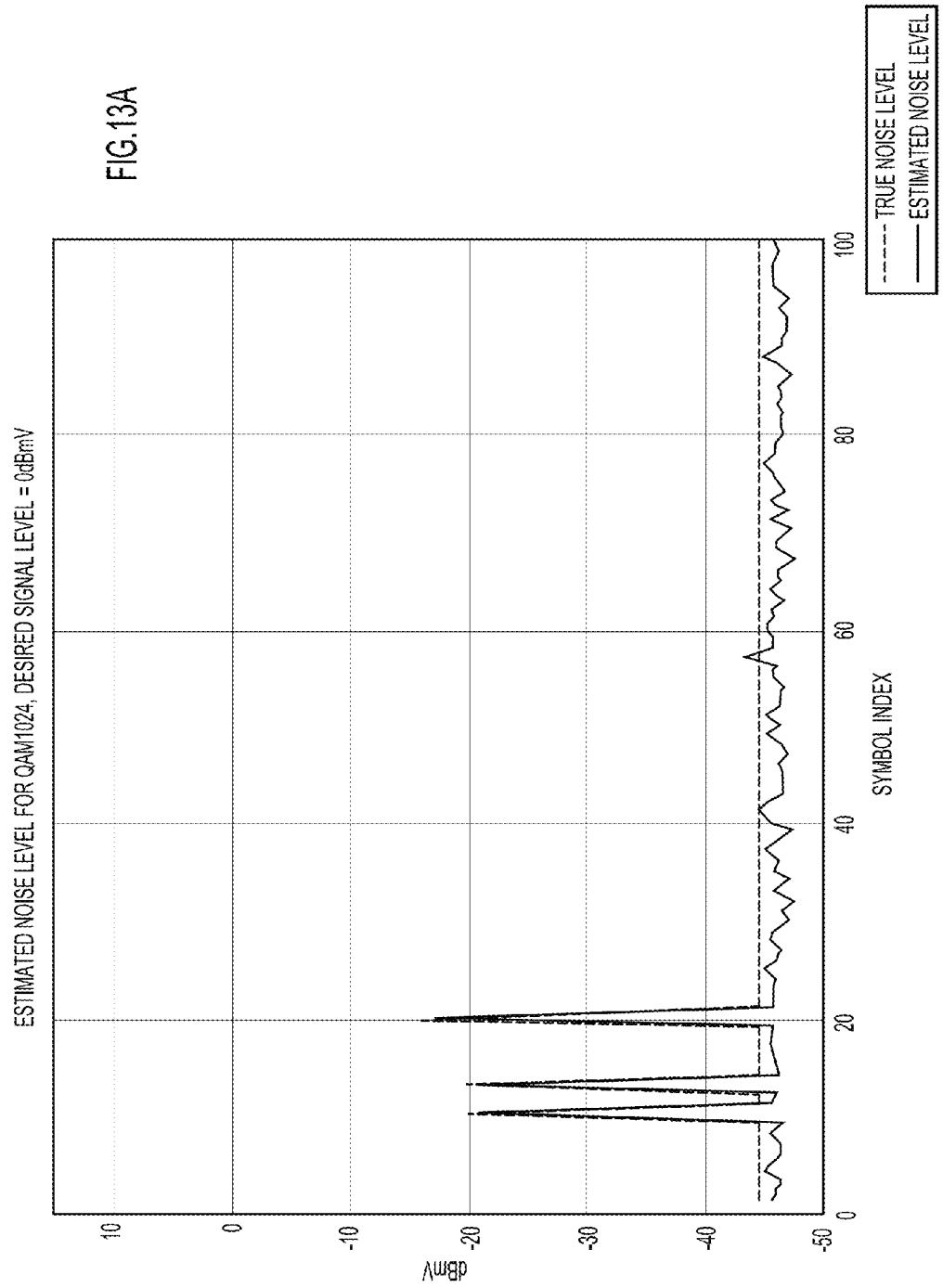

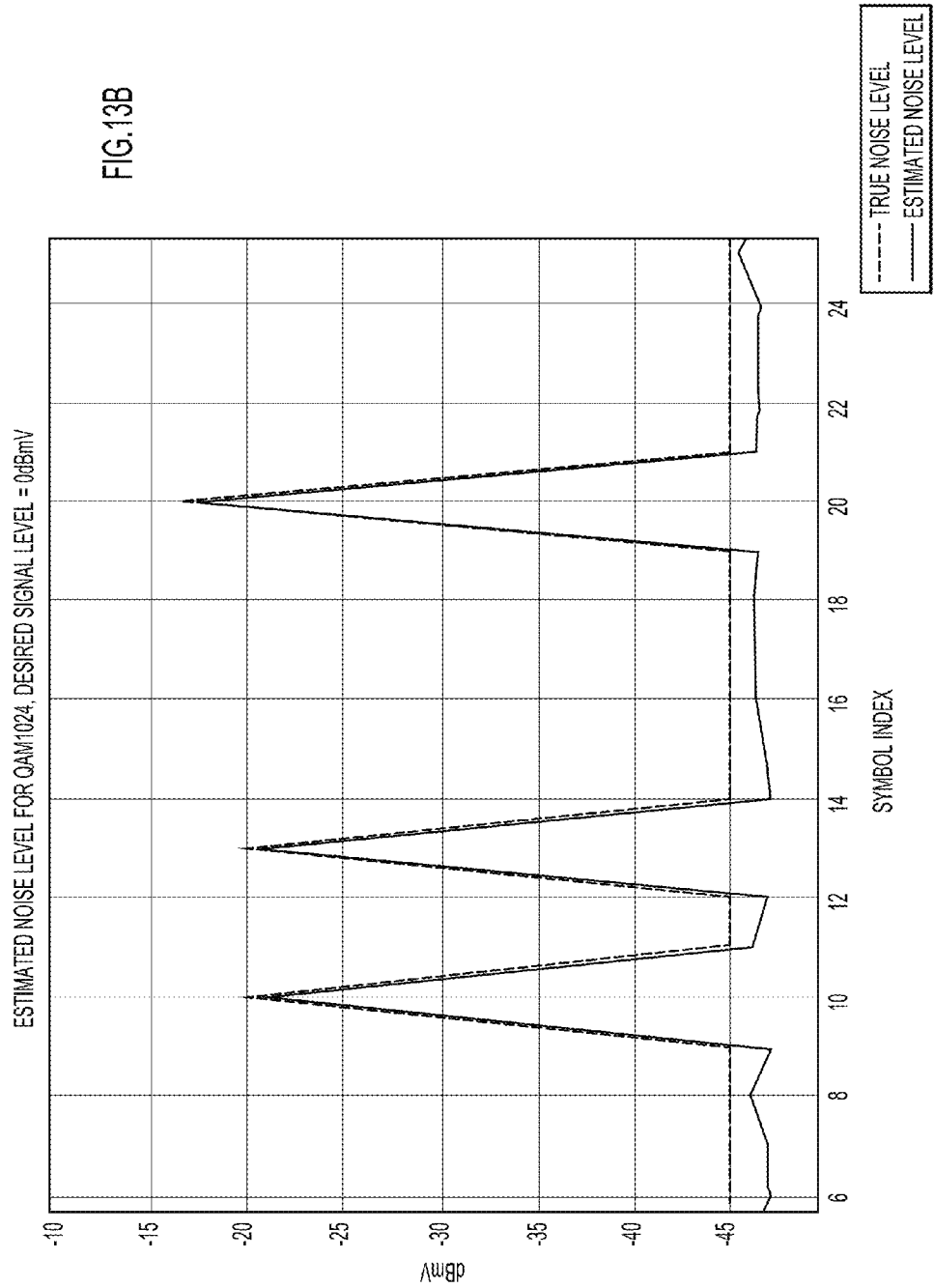

NON-DISRUPTIVE NETWORK NOISE MEASUREMENT

CROSS-REFERENCE TO RELATED APPLICATIONS

This application is a continuation-in-part of, and claims the benefit of, U.S. patent application Ser. No. 14/056,300, filed Oct. 17, 2013, the entire content of which is incorporated herein by reference.

TECHNICAL FIELD

The present disclosure relates to noise estimation in a communication channel.

BACKGROUND

A Hybrid Fiber Coaxial (HFC) network is a telecommunications network that uses optical fiber cables and coaxial cables in different portions of the network to carry content (e.g., video, data, voice, etc.). For example, a Multiple System Operator (MSO) may install (or have installed) fiber optic cable from the distribution center (head-end facility) to intermediate nodes located close to a large number of users. From these intermediate nodes, coaxial cable may extend to individual businesses, residences, or other locations. A HFC network may be advantageous in that features of fiber optic cable (e.g., high bandwidth, low noise/interference susceptibility, etc.) can be utilized to reach points close to the users without having to install fiber optic cables to individual locations.

In general, messages/data are transmitted from a transmitting device to a receiving device over an HFC communication channel. Noise may be inherently present within such a communication channel. The transmission of messages over a noisy communication channel often involves some type of forward error checking/correcting process in order to reduce or eliminate noise induced errors at the receiving device.

BRIEF DESCRIPTION OF THE DRAWINGS

FIGS. 8A and 8B illustrate a horizontal noise estimate for QAM64 in accordance with an example embodiment.

FIGS. 9A and 9B illustrate a vertical noise estimate for QAM64 in accordance with an example embodiment.

FIGS. 10A and 10B illustrate a horizontal noise estimate for QAM256 in accordance with an example embodiment.

FIGS. 11A and 11B illustrate a vertical noise estimate for QAM256 in accordance with examples presented herein.

FIGS. 12A and 12B illustrate a horizontal noise estimate for QAM1024 in accordance with an example embodiment.

FIGS. 13A and 13B illustrate a vertical noise estimate for QAM1024 in accordance with an example embodiment.

DESCRIPTION OF EXAMPLE EMBODIMENTS

Overview

Figure 1:
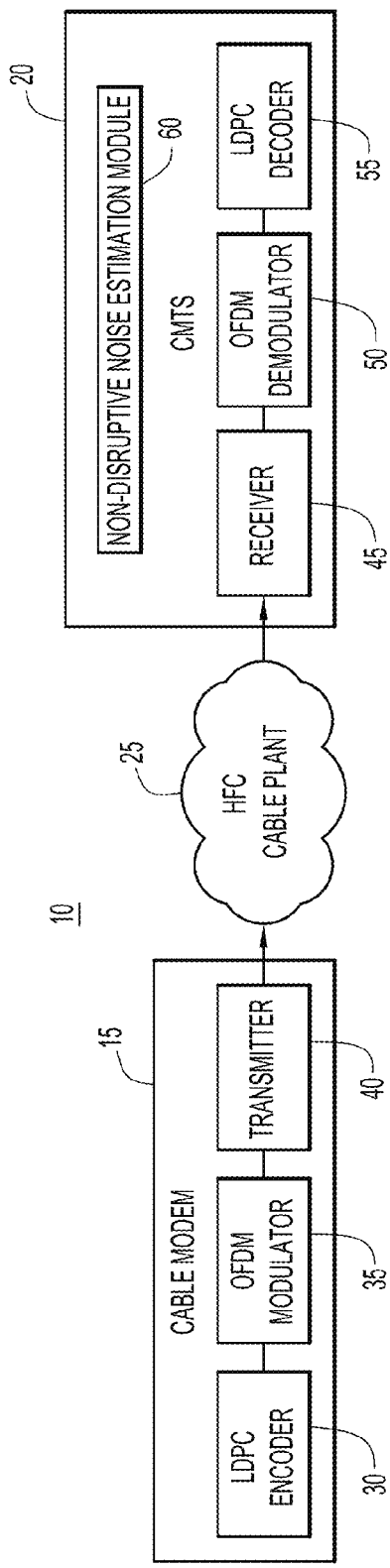
FIG. 1 is a block diagram of an HFC network configured to implement non-disruptive noise estimation techniques in accordance with an example embodiment.

Presented herein are non-disruptive noise estimation techniques that utilize a correlation between attributes of a received signal and the noise to generate estimated noise values for symbols of the signal. A digital signal comprising symbols transmitted over a telecommunications network is received. For each of a plurality of the symbols, an estimated noise value associated with the respective symbol is generated through a correlation of a log-likelihood ratio (LLR) value to predetermined noise values. The estimated noise values for the plurality of symbols are used to compute noise information representing time and frequency characteristics of noise in the telecommunications network.

Example Embodiments

Noise estimation in a Hybrid fiber coaxial (HFC) network may be used for a variety of purposes. For example, Multiple System Operators (MSOs) generally desire effective mechanisms to monitor/measure the HFC network noises (e.g., burst noise/ingress noise). Furthermore, real time noise measurement provides an effective tool for MSOs to perform network debugging and diagnostics (e.g., when poor service is detected, the MSO will be able to pull out the noise measurement log and determine if the poor service is caused by the noise or another issue). Real time network noise measurements allow an MSO to manage the HFC pro-actively (e.g., look for loose cables if the measured noise level becomes abnormal). Additionally, to enhance the spectrum efficiency, the Data Over Cable Service Interface Specification Version 3.1 (DOCSIS 3.1), employs dynamic bit loading and customized user profiles. Profiles generally have varying Quadrature Amplitude Modulation (QAM) order cross spectrum that depends, for example, on the signal qualities (e.g., signal level and noise level) at each subcarrier. Moreover, if the noise levels at certain subcarriers are consistently high, a cable modem termination system (CMTS) may choose not to use those subcarriers (excluded subcarriers). These various DOCSIS 3.1 operations rely upon accurate noise measurements at each subcarrier.

As such, presented herein are non-disruptive/non-invasive HFC noise measurement techniques that can be utilized to identify substantially any noise types and levels without the need for dedicated measurement spectrum or a dedicated time slot. That is, the non-disruptive noise measurement techniques can be performed using the active communication signals and there is no need to use pilots or other dedicated measurement signals. The noise measurement techniques presented herein are not only non-disruptive, but may also have high sensitivity and accuracy, can be applied for any kinds of noises, and have low implementation complexity.

Noise estimation may be used in a large number of applications that involve the transmission of messages/data (e.g., video, audio, etc.) over a noisy channel. Merely for ease of illustration, the non-disruptive noise measurement techniques presented herein will be described with reference to noise estimation in a DOCSIS 3.1 cable network. However, it is to be appreciated that the non-disruptive noise measurement techniques may be used in other cable networks. Also for ease of illustration, the non-disruptive noise measurement techniques are primarily described with reference to an orthogonal frequency-division multiplexing (OFDM) system. It is to be appreciated that the non-disruptive noise measurement techniques are not limited to OFDM systems, but rather are applicable to other systems (e.g., a single-carrier QAM system). As such, the non-disruptive noise measurement techniques should not be interpreted as implying or requiring an OFDM system.

It is known that a large number of personal/home users access the Internet through cable networks that utilize existing cable television infrastructure to transmit/receive Internet traffic. In a typical configuration, a personal computer is connected to the cable modem that interfaces with a coaxial cable forming part of a hybrid fiber/coaxial cable (HFC) cable plant used to provide cable television service to the home, office, etc. FIG. 1 is a block diagram of an example DOCSIS 3.1 cable network 10 comprising a cable modem 15 connected to a cable modem termination system (CMTS) 20 via an HFC cable plant 25 (e.g., hybrid fiber/coaxial cables and associated hardware).

In the cable network 10, digital data is transmitted between the cable modem 15, typically located at the user's home or office, and the CMTS 20, typically located at the head end of the network. The digital data is carried using radio frequency (RF) carrier signals. As such, the cable modem 15 includes an LDPC encoder 30, an OFDM multiplexing modulator 35, and a transmitter 40 (e.g., transmitter (Tx) front end circuitry). The low-density parity-check (LDPC) encoder 30 is configured to generate an LDPC code word for transmission with digital data (messages) over the cable plant 25. The OFDM modulator 35 is configured to convert the digital data and LDPC codes into a modulated RF signal for upstream transmission to the CMTS 20 using the transmitter 40.

The CMTS 20 comprises a receiver 45 (e.g., receiver (Rx) front end circuitry), an OFDM demodulator 50, an LDPC decoder 55, and a non-disruptive noise estimation module 60. The receiver 45 receives the modulated signals sent by the cable modem 15 and the OFDM demodulator 50 demodulates the received upstream RF signals. The LDPC decoder 55 is used with the OFDM demodulator 50 to reconstruct the original messages for transmission/forwarding to another node or entity.

The OFDM demodulator 50 may comprise, for example, a Fast Fourier Transform (FFT) module, a channel estimator, an equalizer, and a deinterleaver. In operation, demodulated signals (produced by OFDM demodulator 50) are provided to the non-disruptive noise estimation module 60. In the example of FIG. 1, the non-disruptive noise estimation module 60 is configured to execute the non-disruptive noise estimation techniques presented herein.

A log-likelihood ratio (LLR) may be determined for bits in a received signal. Equation 1, below, is an equation that may be used to calculate an LLR for a bit within a received signal.

$$LLR = \lambda^0(r, b_k=0) - \lambda^1(r, b_k=1) \quad \text{Equation 1:}$$

Where $\lambda^i(r, b_k=i)$ represents the probability that a bit $b_k=i$ (i=0, 1) with received signal (r) (in log scale) where k points to the $k^{th}$ bit in the symbol, and it is computed in accordance with Equation 2, below.

$$\lambda^i(r, b_k = i) = \log \sum_{s \in S_{b_k}^i} Pr(r \mid s, h) \quad \text{Equation 2}$$

$$\equiv \log \sum_{s \in S_{b_k}^i} \exp\left(-\frac{\|r - hs\|^2}{2\sigma^2}\right)$$

where h is the channel coefficient, s is a QAM constellation (e.g., binary phase-shift keying (BPSK), quadrature phase-shift keying (QPSK), n-QAM) point, $s_{b_k}^i$ is a collection of constellation points containing the value i at bit index k, and σ is the noise standard deviation.

Given the received signal r, the value for h can be obtained/removed through the channel estimation, s is known for a given QAM order, and σ can be estimated. In general, σ is the standard deviation of the noise embedded in the signal and can change from symbol to symbol.

Figure 2A:
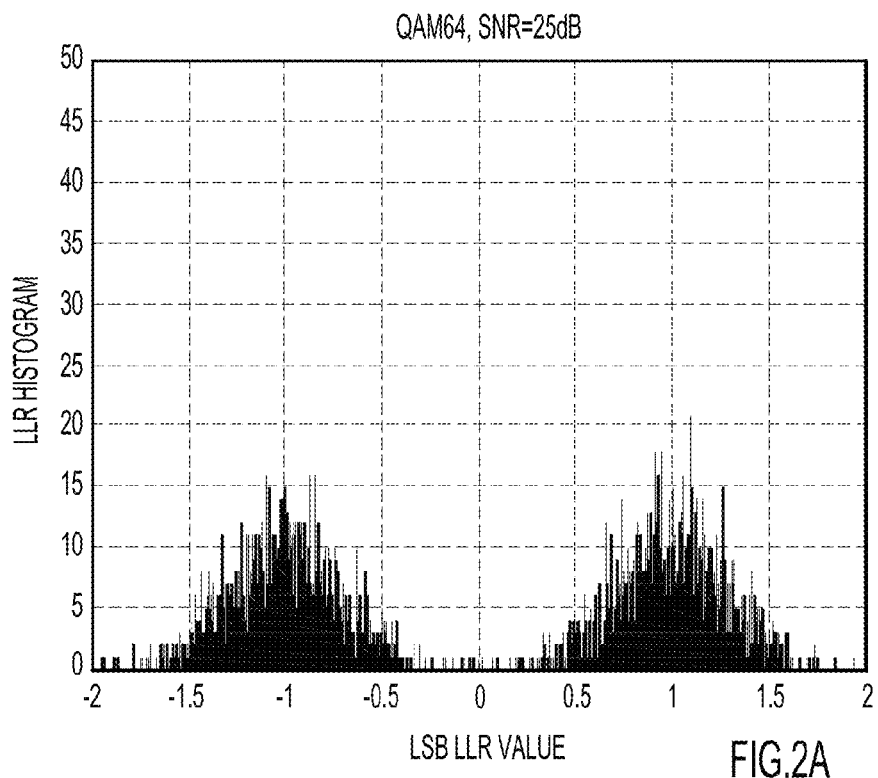
FIGS. 2A and 2B are histograms illustrating a correlation of noise to signal attributes in accordance with an example embodiment.
Figure 2B:
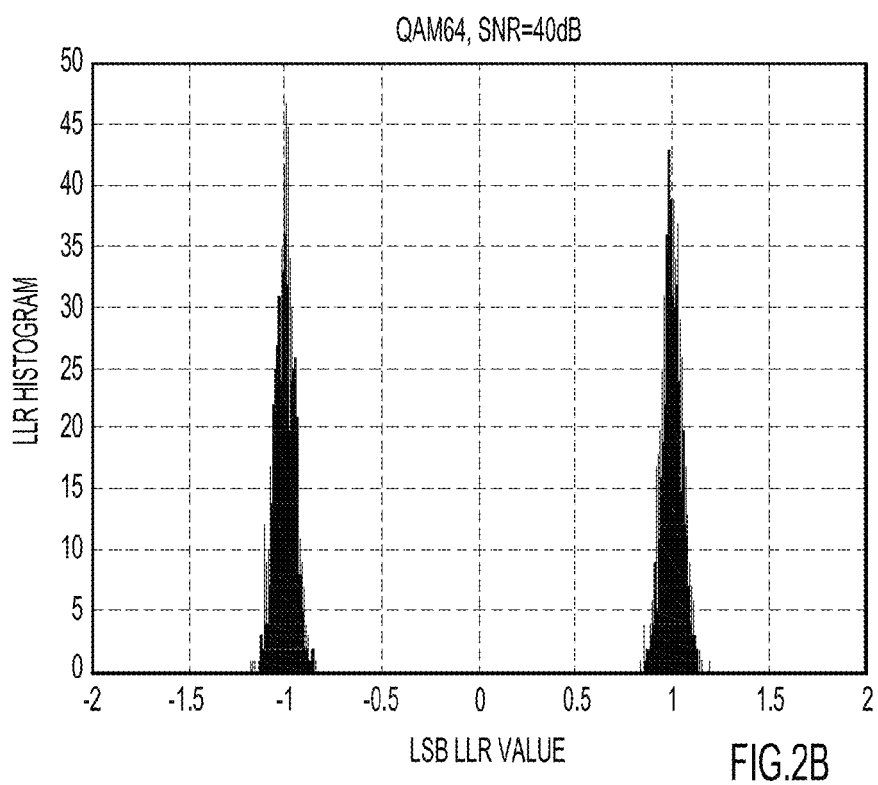

It has been discovered that when certain bits of symbols (e.g., the least significant bits (LSBs) and/or the second LSBs (LSB+1s)) in a digital signal are mapped into a symbol constellation following the gray mapping scheme (gray code), the distribution of LLR values calculated from the bits will follow a bimodal shape as shown in FIGS. 2A and 2B. More specifically, FIGS. 2A and 2B are example histograms schematically illustrating the correlation of LSB LLR values (e.g., LLR values calculated from the LSBs) for various signal-to-noise ratios (SNRs). FIG. 2A illustrates a situation where the SNR in a received 64 QAM (QAM64) signal is relatively low (e.g., 25 decibels (dB)) and the LSB LLR distribution is relatively widespread. Conversely, FIG. 2B illustrates a situation where the SNR in a received 64 QAM signal is relatively high (e.g., 40 dB) and the LSB LLR distribution is relatively narrow. Mathematically, the distribution or spreading can be quantitatively expressed with its standard deviation; wide spreading has a larger standard deviation and narrow spreading has a less standard deviation. As such, the standard deviation of the LSB LLRs, referred to herein as $\sigma_L$, is inversely proportional to the signal SNR, as illustrated by FIG. 2A and FIG. 2B. Since the level of a signal is known, the $\sigma_L$ can accordingly be correlated to the noise within the signal.

The techniques presented herein are primarily described with reference to the use of LSBs to calculate $\sigma_L$ for use in determining the noise at a frequency and time point. However, it is to be appreciated that reference to LSBs is merely for ease of illustration and that the techniques may also be used with other bits of received symbols, such as the second least significant bits (LSB+1s). The techniques can also operate by combining the standard deviations of the LSBs and LSB+1s to determine a $\sigma_L$. That is, an LLR value may be calculated for either the least significant bit or the second least significant bit of the symbols, or for both the least significant bit and the second least significant bit of the symbols.

Figure 3:
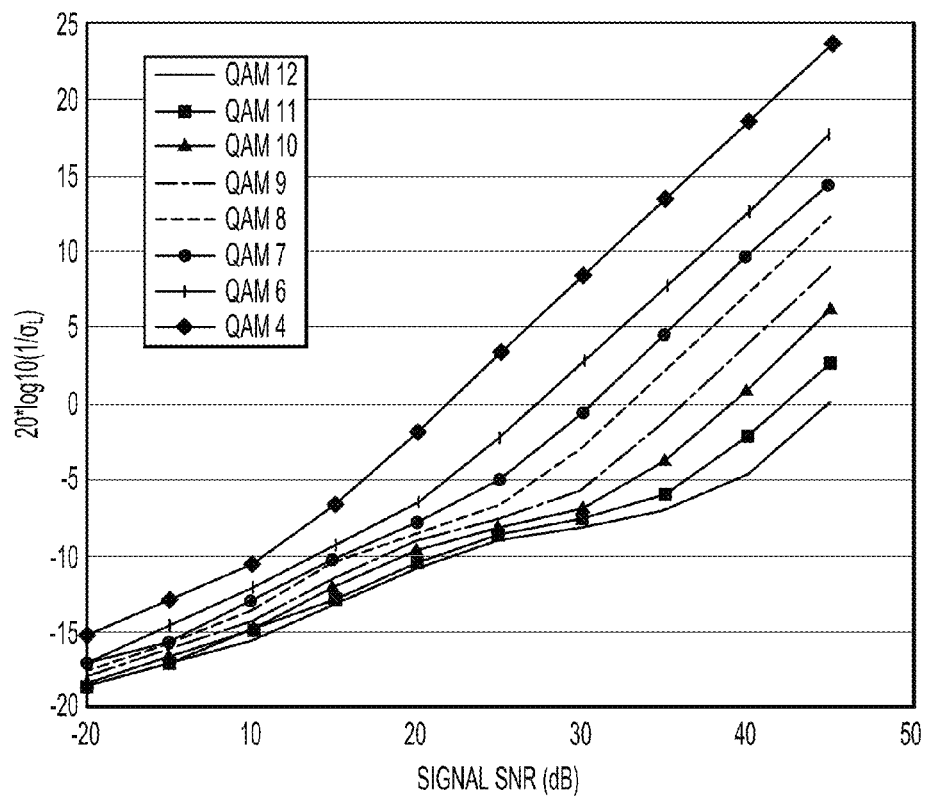
FIG. 3 is a graph illustrating a calculated standard deviation value as a function of the noise in a signal, according to an example embodiment.

FIG. 3 is a graph illustrating $\sigma_L$ as a function of SNR for given QAM orders. In addition to the inverse relationship of $\sigma_L$ to SNR, it has also been discovered that the relationship of $\sigma_L$ with the SNR is consistent and repetitive given the QAM order. These relational properties between $\sigma_L$ and SNR provide the basis for a lookup table of $\sigma_L$ values versus estimated noise variance (correlated to SNR). As described further below, the techniques presented herein calculate a $\sigma_L$ that may be used as an index into a lookup table to identify the estimated noise variance of a signal at both a time and frequency point. Also as described further below, the estimated noise variance determined from the lookup table may then be used to compute a two-dimensional (2D) noise matrix that represents the noise in an HFC network at both time and frequency points.

Figure 4:
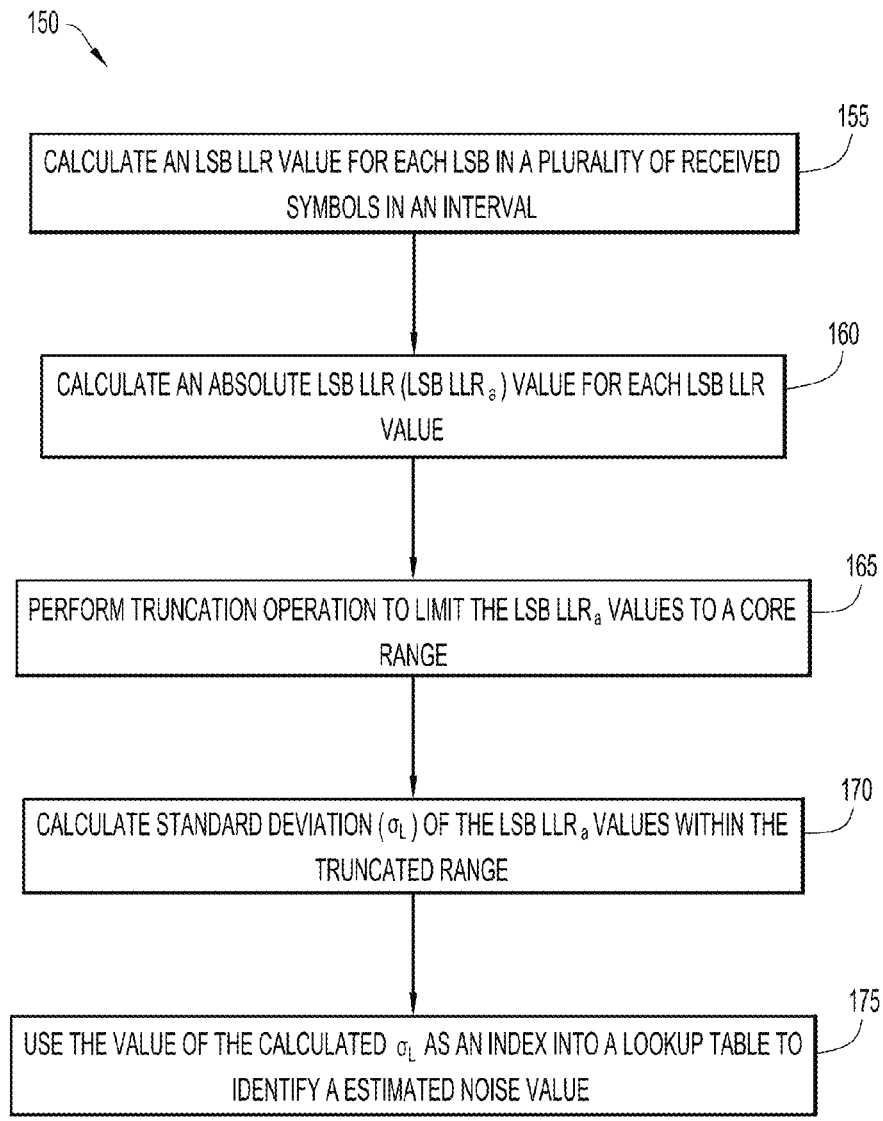
FIG. 4 is a flowchart of part of a non-disruptive noise estimation method in accordance with an example embodiment.

FIG. 4 is a detailed flowchart illustrating part of a non-disruptive noise estimation method 150 in accordance with examples presented herein. Method 150 begins at 155 where an LLR value is calculated for the LSB of each of a plurality of symbols in a received time and/or frequency interval. The LLR values calculated based on LSBs are sometimes referred to herein as LSB LLRs or LSB LLR values. As noted above, the use of LSBs is merely illustrative and other bits in a received symbol (e.g., LSB+1s) may also or alternatively be used in other examples.

As noted above, LLR calculations rely upon σ, which is the standard deviation of the noise embedded in the signal. The value of σ is unknown and an objective of the techniques presented herein is to provide a mechanism for effectively estimating σ for use in determining an estimated noise variance. Since σ is unknown, during calculation of the LSB LLRs, σ is simply assigned a value of "1." That is, the LSB LLRs are calculated in accordance with Equations 1 and 2, above, where σ is assigned the value of 1.

At 160, an absolute LSB LLR, referred to herein as an LSB $LLR_a$ value or an LSB $LLR_a$, may be optionally calculated for each LSB LLR (e.g., all negative values may be flipped to positive values). In certain circumstances, LSB $LLR_a$ values may exist that have the potential to skew the results of the noise estimation. Therefore, at 165, a truncation operation may be performed to limit the LSB $LLR_a$ values to a core range from which the possibly skewing LSB $LLR_a$ values have been substantially removed, thereby providing a range that better reflects the actual reliabilities of the received bits. In certain embodiments, the truncated range (TR) is defined below as shown in Equation 3.

$$TR = N \times D^2 \quad \text{Equation 3:}$$

where N is a numerical value selected based on the QAM order of the signal and D is the spacing between adjacent points in the corresponding QAM constellation.

The truncation operations described above are illustrative and other truncation methods may be used in alternative examples. For example, a truncation/saturation may be performed on the received symbols (e.g., before LLR calculation) within a certain range. This can be saturation on the I and Q values when the received symbol is in Cartesian notation or this can be saturation on the magnitude when the received symbol is in Polar notation (e.g., saturate the magnitude, but keep the angle). In such examples, the LSB $LLR_a$ values are calculated for only the symbols with the truncated range of received symbols to yield a truncated range of LSB $LLR_a$ values At 170, the $\sigma_L$ (standard deviation) of the LSB $LLR_a$ values within the truncated range is calculated. At 175, the value of the calculated $\sigma_L$ is used as an index into a lookup table to identify or point to a specific estimated noise variance (estimated noise value) for the plurality of symbols in a received time and/or frequency interval. In other words, the noise at symbols in the frequency/time range is estimated through an empirical lookup table that correlates the noise level with the LLR standard deviation of the last or last two bits of the m-tuple QAM bits on the cell.

As noted, the group of symbols that are evaluated to determine a σ value may be within a time interval and/or a frequency interval. For example, in the context of a frequency interval, the signal may occupy some bandwidth (e.g., a total 20 megahertz (MHz) bandwidth). This bandwidth may be divided into frequency intervals (e.g., two 10 MHz intervals) and a σ value may be calculated for the symbols in each frequency interval. This may be particularly applicable to an OFDM system where the spectrum is divided into many narrow subcarriers.

As noted above, the $\sigma_L$ is related to the SNR in a consistent and repetitive manner for a given QAM order. These relational properties between $\sigma_L$ and SNR can be used in a number of different approaches to generate a lookup table of $\sigma_L$ values versus estimated noise values (correlated to SNR). More specifically, in one example, the relationship between actual $\sigma_L$ values and actual SNRs and thus estimated noise values are established through simulations (i.e., since the signal may be known, the signal portion of the SNR may be removed to determine the noise that is present). More specifically, a certain SNR and QAM order may be set and simulations are conducted. A value for $\sigma_L$ can then be calculated from the collected LLR values. This process may be repeated for various SNRs and QAM orders to obtain a complete lookup table of estimated noise values versus $\sigma_L$ values.

In another example, the relationship between actual $\sigma_L$ values and actual noise values can be obtained through factory calibration of a device configured to perform the operations described herein. In an example factory calibration approach, the SNR and QAM order of an input signal are set to a certain value and processed (decoded) using an initial standard lookup table. Estimated noise values are then collected at the output of the device. The values in the initial lookup table may then be adjusted until the estimated noise values (derived from the SNRs) match the set noise values.

It is to be appreciated the order of operations shown in FIG. 4 is merely illustrative. In certain examples, the various operations may be performed in a different order than as described above.

In summary of FIG. 4, a time and/or frequency interval of a digital signal is received at a receiving device in a network. An LLR value is calculated for a plurality of bits in the interval of the digital signal. In certain examples, the received interval of the digital signal comprises a plurality of digital symbols each having an LSB. In certain examples, an LLR value is calculated for each of the LSBs of the digital symbols. In other examples, an LLR value is calculated for each of the LSB+1s, or the LSBs and the LSB+1s of the symbols.

Furthermore, a scalar value (e.g., standard deviation) that relates to a distribution of the calculated LLR values is calculated. An estimated noise value for symbols in the interval of the signal is determined based on a predetermined correlation between the scalar value and the received noise. The predetermined correlation may be, for example, a pre-stored lookup table, a mathematical formula, etc.

Figure 5:
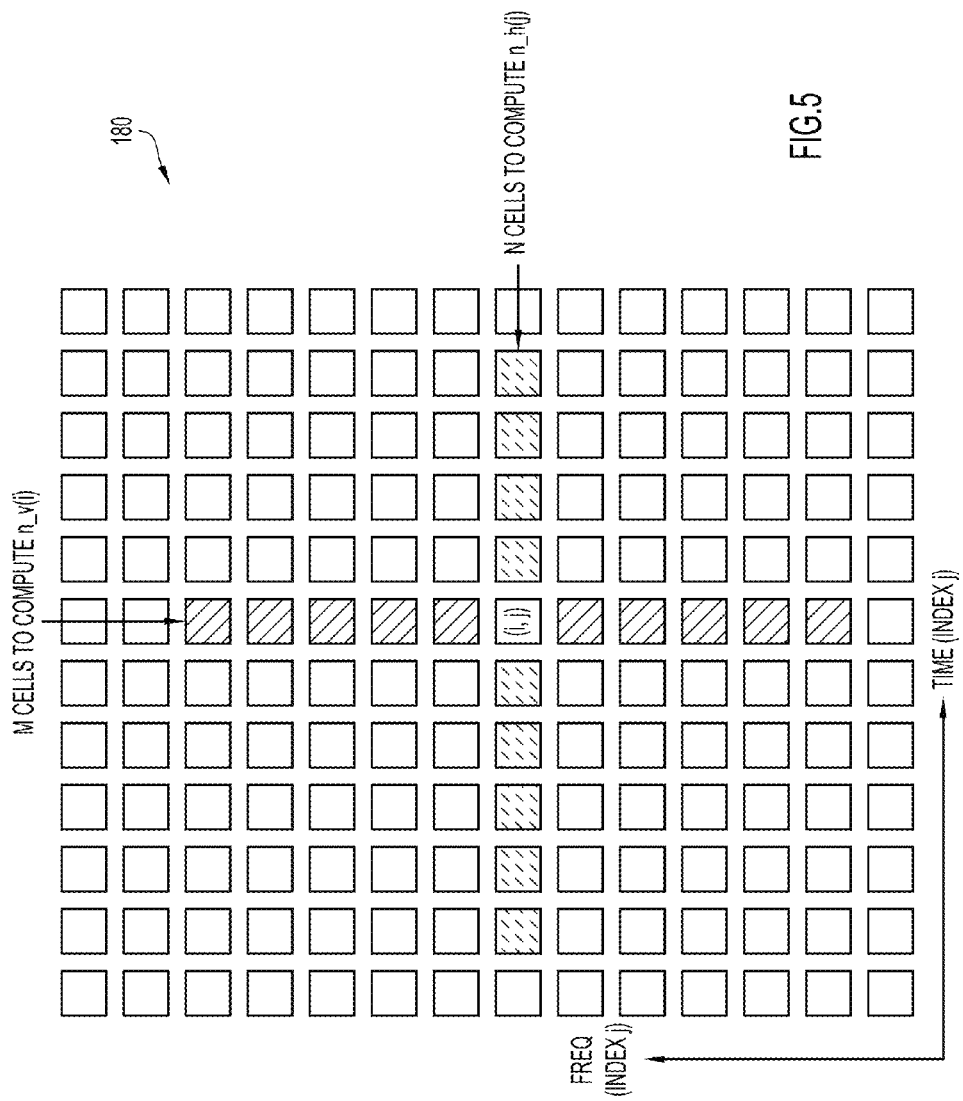
FIG. 5 illustrates a two-dimensional noise matrix in accordance with an example embodiment.

The above described operations of FIG. 4 may be performed to estimate the noise for a number of different symbols (e.g., different time or frequency ranges). In accordance with the techniques presented herein, the noise estimated at each symbol can be utilized to run averages over both the time (horizontal) and frequency (vertical) axes to generate a two-dimensional (2D) noise matrix. FIG. 5 illustrates an example two-dimensional noise matrix 180 generated in accordance with examples presented herein. This two-dimensional noise matrix 180 can be exported to other networking device layers (e.g., from the PHY to MAC) as an HFC network noise measurement.

Regarding the two-dimensional matrix 180, the OFDM cells are displayed such that the time (symbol) axis is horizontal and the frequency (subcarrier) axis is vertical. As such, the noise on subcarriers are referred as horizontal noise (n_h), and the noise at symbols are referred as vertical noise (n_v).

In a two-dimensional OFDM frequency-time space, the estimated noise at a point/cell (i,j) may be denoted as n(i,j), where i is the symbol index along the time axis, and j is the subcarrier index along the frequency axis. The horizontal noise average/variance (along the time axis) at a cell (i, j) is denoted as n_h(j) and may be given as shown below in Equation 4. The vertical noise average/variance (along the frequency axis) at a cell (i, j) is denoted as n_v(i) and may be given as shown below in Equation 5.

$$n\_h(j) = \Sigma_{i_1}^{i_N} n(i,j)/N \qquad \text{Equation 4:}$$

$$n\_v(i) = \Sigma_{j_1}^{j_M} n(i,j)/M \qquad \text{Equation 5:}$$

where N and M are configurable and $(i_1, i_2, \ldots, i_N)$ is the average range for n_h(j), and $(j_1, j_2, \ldots, j_M)$ is the average range for n_v(i).

In certain examples, n_h(j) and n_v(i) can be computed with moving averaging. In other words, at each cell (i,j), the noise values from N adjacent cells on the same subcarrier may be used to compute the n_h(j) at cell(i), and the noise values from M adjacent cells on the same symbol time may be used to compute the n_v(j) at cell(i).

As noted above, the noise at each cell is estimated through an empirical lookup table that correlates the noise level with the LLR standard deviation of the last two bits of the m-tuple QAM bits on the cell. Since the relation of the LLR standard deviation to the signal SNR is consistent and repetitive for a given QAM order only, the lookup table differs for different QAM orders. Thus, when the average range runs cross subcarriers with different QAM orders, the noise needs to be estimated from different cells with different lookup tables and averaged linearly.

Figure 6:
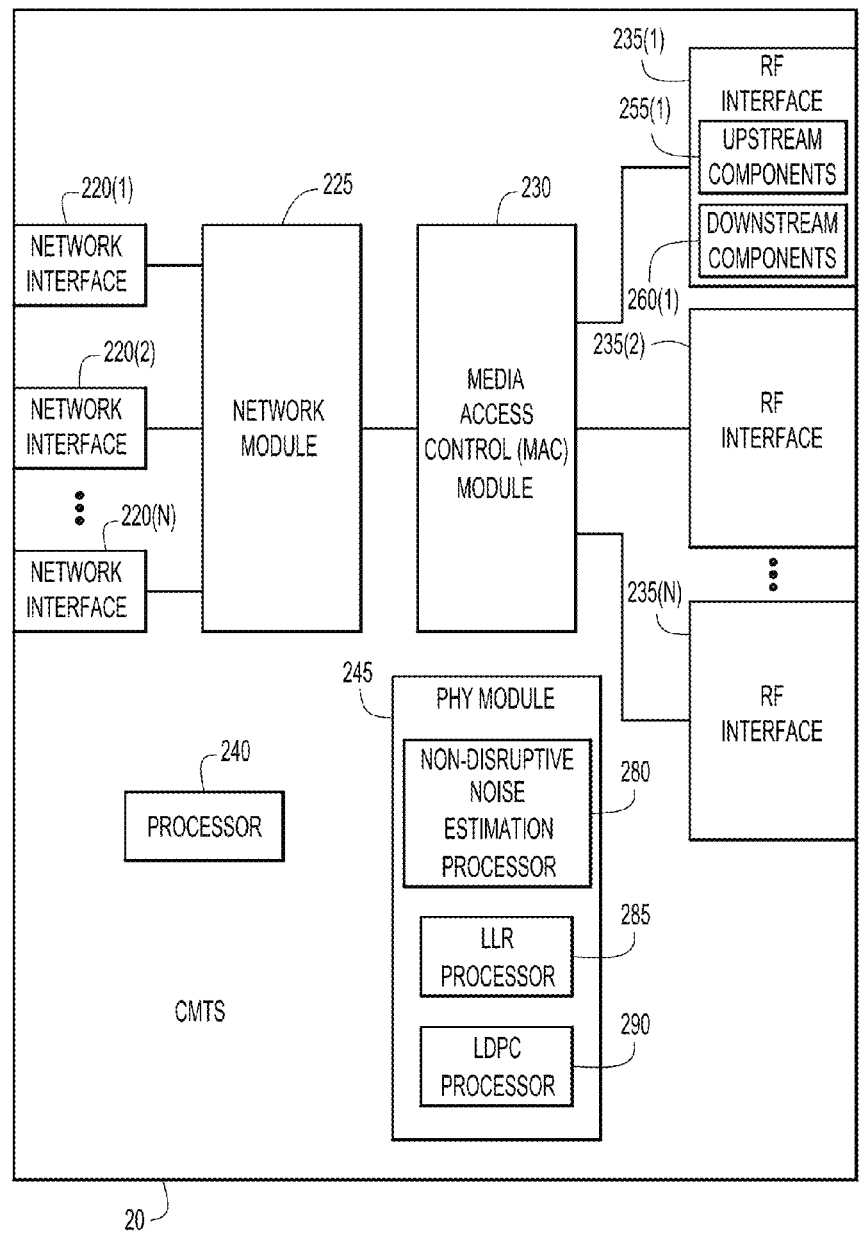
FIG. 6 is a block diagram of a cable modem termination system configured to implement non-disruptive noise estimation techniques in accordance with an example embodiment.

FIG. 6 is a block diagram of one example configuration of CMTS 20 of FIG. 1. As shown, CMTS 20 comprises a plurality of network interfaces 220(1)-220(N), a network module 225, a media access control (MAC) module or simply MAC 230, a plurality of radio-frequency (RF) interfaces 235(1)-235(N), a processor 240, and a PHY module 245.

Generally, network module 225 interfaces with MAC 230 to transmit information between the two modules. Processor 240 is generally configured to manage bandwidth processing, and is in communication with both MAC 230 and network module 225 via, for example, a Peripheral Component Interconnect (PCI) bus (not shown in FIG. 6).

MAC 230 comprises hardware, software, or a combination thereof and is configured to interface with the plurality of RF interfaces 235(1)-235(N) to transmit RF signals to, or receive RF signals from, one or more cable modems (e.g., cable modem 15 in FIG. 1). RF interfaces 235(1)-235(N) are upstream/downstream physical layer interfaces (PHYs) each configured for connection to a coaxial cable. More specifically, RF interfaces 235(1)-235(N) include upstream PHY components 255(1)-255(N) and downstream PHY components 260(1)-260(N), which collectively operate to interface with RF circuitry. For ease of illustration, only the details of RF interface 235(1) are shown in FIG. 6 and, as such, only RF interface 235(1) is described in detail.

The upstream PHY components 255(1) operate to receive RF signals from a cable modem, and as such, the upstream PHY components 255(1) operate as a demodulator. As such, the functionality of receiver 45 (FIG. 1) and OFDM demodulator 50 (FIG. 1) may be provided by the upstream PHY components. The downstream PHY components 260(1) operate to transmit RF signals to a cable modem, and, because the signals on a coaxial cable are modulated signals (e.g., RF signals), the downstream PHY components 260(1) operate as a modulator.

MAC 230 operates to prepare packets for transmission to cable modems and to prepare packets received from the cable modems for use by network module 225. The packet preparation may include, for example, encryption, decryption, suppression, expansion, concatenation, fragmentation, multiplexing, demultiplexing, etc., depending on the desired configuration of the CMTS 20 and the related components.

Network interfaces 220(1)-220(N) connect CMTS 20 with an external network (e.g., a wide area network (WAN), a local area network (LAN), etc.) Network module 225 receives packets from MAC 230, and prepares the packets for forwarding to the network via interfaces 220(1)-220(N). Similarly, network module 225 receives packets from the network (via interfaces 220(1)-220(N)) and prepares these received packets for use by MAC 230. The packet preparation by network module 225 may include, for example, rate shaping, bandwidth limiting, priority queuing, etc., depending on the desired configuration of CMTS 20 and the related components. Processor 240 generally operates to manage system issues of CMTS 20, and in this particular example, all DOCSIS system issues such as scheduling, provisioning, accounting, configuring, etc.

As noted above with reference to FIG. 1, CMTS 20 is further configured to execute LDPC decoding of signals received from a cable modem (i.e., LDPC decoder 55). The operations of LDPC decoder 55 are implemented as part of PHY module 245 that comprises non-disruptive noise estimation processor 280, LLR processor 285, and LDPC processor 290. In the embodiment of FIG. 6, the non-disruptive noise estimation processor 280, LLR processor 285, and LDPC processor 290 are all physical processing elements (e.g., digital logic gates in one or more application-specific integrated circuits (ASICS)). The non-disruptive noise estimation processor 280 is operable to perform the non-disruptive noise estimation operations described herein, including generation of a two-dimensional noise matrix using estimated noise values associated with a plurality of received symbols and to export the two-dimensional matrix from the PHY module 245 to the MAC 230 (i.e., perform noise measurement results reporting using, for example, a Upstream External PHY Interface (UEPI) interface).

In certain embodiments, the PHY module 245 may be connected between the RF interfaces 235(1)-235(n) and the MAC 230 to receive demodulated signals or may be part of the upstream components 255(1). However, merely for ease of illustration, PHY module 245 is shown in FIG. 6 as separate element. It is also to be appreciated that the implementation of FIG. 6 is merely illustrative and that other implementations are possible.

Figure 7:
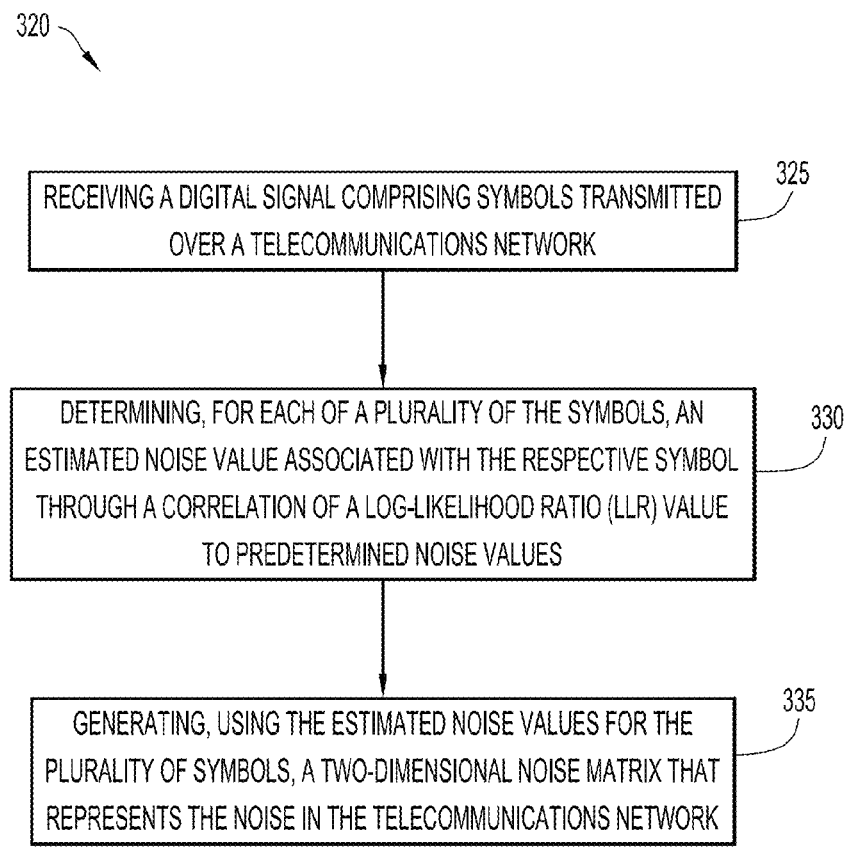
FIG. 7 is a high-level flowchart of an example method in accordance with an example embodiment.

FIG. 7 illustrates a high-level flowchart of a non-disruptive noise estimation method 320 in accordance with embodiments presented herein. The non-disruptive noise estimation processor 280 may be configured to perform method 320.

The method 320 begins at 325 where a digital signal comprising symbols transmitted over a telecommunications network is received, for example, at a CMTS. At 330, for each of a plurality of the symbols, an estimated noise value associated with the respective symbol is determined using a correlation of an LLR value to predetermined noise values. At 335, the estimated noise values for the plurality of symbols are used to generate noise information representing time and frequency characteristics of noise in the telecommunications network (i.e., generate a two-dimensional noise matrix that represents the network noise in the telecommunications network).

In certain examples of FIG. 7, the two-dimensional noise matrix is generated by computing averages of the estimated noise values over both time and frequency. The computed averages may be moving averages. The two-dimensional noise matrix may be exported from a PHY module to a MAC module of a CMTS.

An estimated noise value associated with a symbol may be determined by calculating an LLR value for a plurality of bits within an interval of the signal, computing a scalar value that relates to a statistical distribution of the calculated LLR values, and using a predetermined correlation between the scalar value and symbol noise to determine the estimated noise value. In certain examples, the interval of the signal comprises a plurality of symbols each having a least significant bit and a second least significant bit, and an LLR value for a plurality of bits is calculated for either the least significant bit or the second least significant bit of the symbols, or for both the least significant bit and the second least significant bit of the symbols.

The scalar value that relates to a statistical distribution of the calculated LLR values may be a standard deviation of the calculated LLR values. The standard deviation of the LLR values may be used as an index into a stored lookup table that correlates the noise within the received interval of the signal to the standard deviation of the calculated LLR values. It is to be appreciated that the order of the operations shown in FIG. 7 is merely illustrative.

Figure 8A:
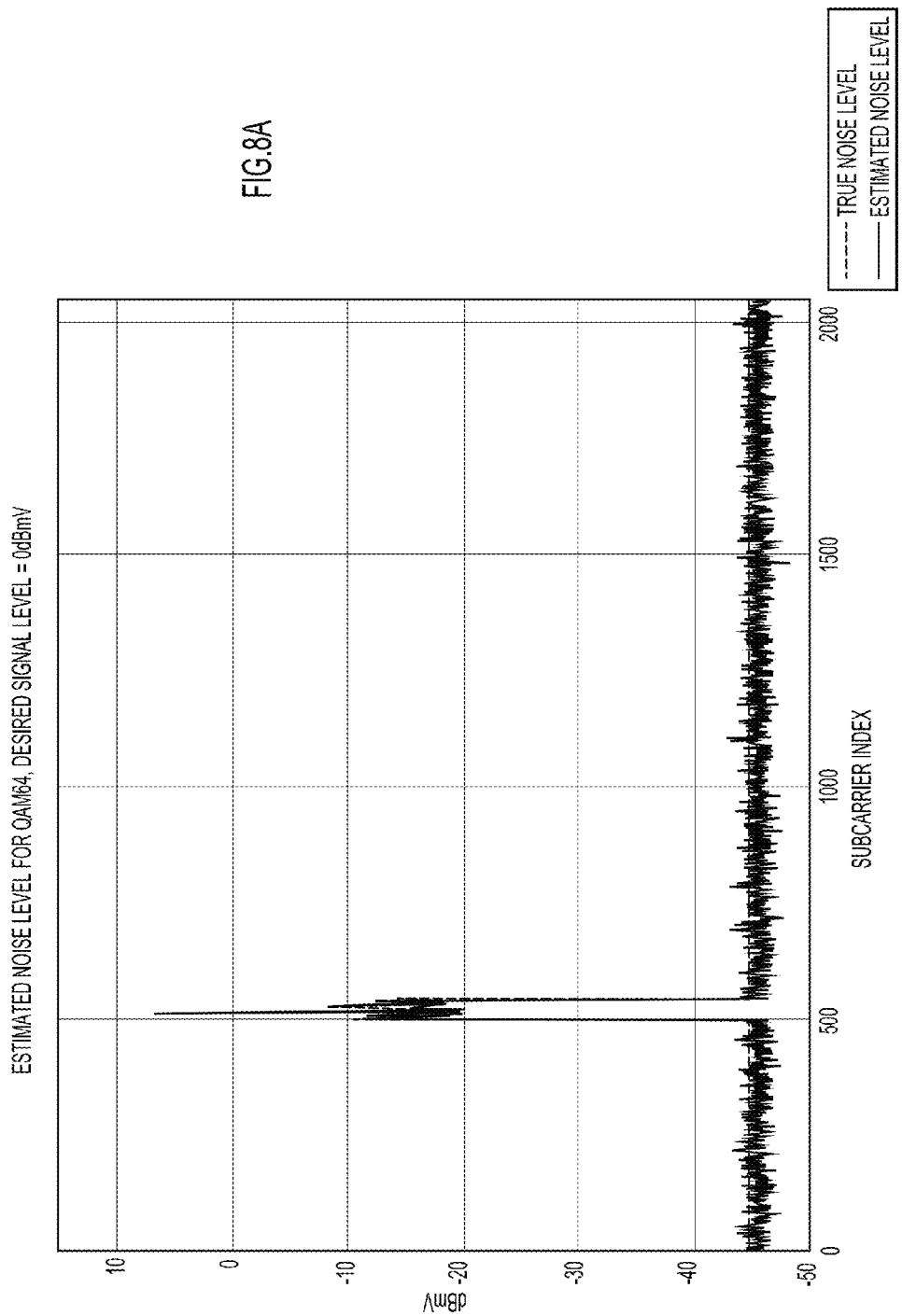

FIGS. 8A-13B are graphs illustrating the correspondence of non-disruptive noise estimates, generated in accordance with examples presented herein, to actual noise. More specifically, FIG. 8A is a graph illustrating horizontal noise estimation for QAM64, while FIG. 8B is an enlarged view of a smaller range of subcarriers shown in the graph of FIG. 8A. As shown, the desired signal occupies all the subcarriers (1 to 2048), while the ingress noise occurs on subcarriers 500 to 539. On certain subcarriers, the ingress noise is buried under the desired signal. In this example, the averaging window length (N) equals forty (40) subcarriers. The estimation accuracy is approximately 2 decibels (dB).

FIG. 9A is a graph illustrating vertical noise estimation for QAM64, while FIG. 9B is an enlarged view of a smaller range of symbols shown in the graph of FIG. 9A. As shown, the desired signal is present at all the times. Burst noises occur on symbols 10, 13 and 20, and are buried under desired signal. In this example, the averaging window length (M) equals forty (40) symbols. The estimation accuracy is approximately 2 decibels (dB).

FIG. 10A is a graph illustrating horizontal noise estimation for QAM256, while FIG. 10B is an enlarged view of a smaller range of subcarriers shown in the graph of FIG. 10A. As shown, the desired signal occupies all the subcarriers (1 to 2048), while the ingress noise occurs on subcarriers 500 to 539. On certain subcarriers, the ingress noise is buried under the desired signal. In this example, the averaging window length (N) equals forty (40) subcarriers. The estimation accuracy is approximately 2 decibels (dB).

Figure 11A:
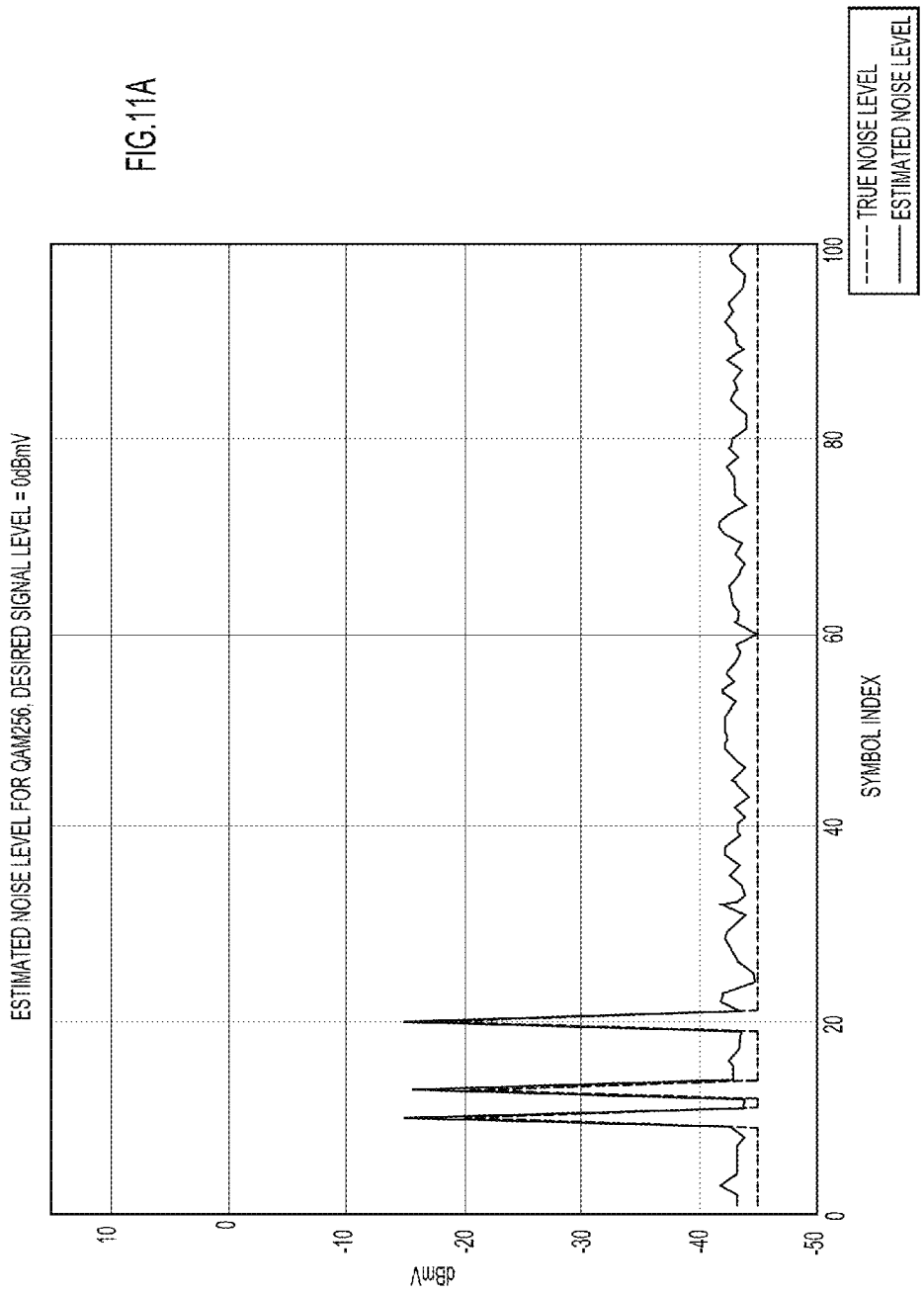

FIG. 11A is a graph illustrating vertical noise estimation for QAM256, while FIG. 11B is an enlarged view of a smaller range of symbols shown in the graph of FIG. 11A. As shown, the desired signal is present at all the times. Burst noise occurs on symbols 10, 13 and 20, and is buried under desired signal. In this example, the averaging window length (M) equals forty (40) symbols. The estimation accuracy is approximately 2 decibels (dB).

FIG. 12A is a graph illustrating horizontal noise estimation for QAM1024, while FIG. 12B is an enlarged view of a smaller range of subcarriers shown in the graph of FIG. 12A. As shown, the desired signal occupies all the subcarriers (1 to 2048), while the ingress noise occurs on subcarriers 500 to 539. On certain subcarriers, the ingress noise is buried under the desired signal. In this example, the averaging window length (N) equals forty (40) subcarriers. The estimation accuracy is approximately 2 decibels (dB).

FIG. 13A is a graph illustrating vertical noise estimation for QAM1024, while FIG. 13B is an enlarged view of a smaller range of symbols shown in the graph of FIG. 13A. As shown, the desired signal is present at all the times. Burst noise occurs on symbols 10, 13 and 20, and is buried under desired signal. In this example, the averaging window length (M) equals forty (40) symbols. The estimation accuracy is approximately 2 decibels (dB).

The noise measurement techniques presented herein need not utilize quieting transmissions. Rather, transmissions "underneath" the noise at each OFDM tone are measured with active signals in real-time. The noise measurement techniques presented herein also enable the noise measurement without any disruptions to the normal transmissions. In general, no special configurations or special transmissions are utilized. The noise measurement techniques presented herein also have high sensitivity and accuracy such that a noise with a level as low as, for example, 5 dB above the thermal noise floor can be measured (e.g., noise buried deep under the desired signal can be measured). Additionally, the noise measurement techniques presented herein can be applied for any kinds of noises, including narrow band ingress or wide band burst noises, with high or low power levels. The noise can be reported as noise per subcarrier (horizontal noise), or noise per symbol (vertical noise). Furthermore, the noise measurement techniques presented herein are easily implementable as the noise measurement is a part of the LDPC weighting scheme that may be implemented for decoding. As a result, no extra cycles may be needed.

To summarize, a method is provided comprising: receiving a digital signal comprising symbols transmitted over a telecommunications network; determining, for each of a plurality of the symbols, an estimated noise value associated with the respective symbol through a correlation of a log-likelihood ratio (LLR) value to predetermined noise values; and generating noise information representing time and frequency characteristics of noise in the telecommunications network.

Similarly, an apparatus is provided, comprising: an interface unit that receives a digital signal comprising symbols transmitted over a telecommunications network; and a processor coupled to the interface unit, that: determines, for each of a plurality of the symbols, an estimated noise value associated with the respective symbol through a correlation of a log-likelihood ratio (LLR) value to predetermined noise values; and generates noise information representing time and frequency characteristics of noise in the telecommunications network.

Further, an apparatus is provided comprising: a plurality of radio frequency interfaces that receive a digital signal comprising symbols transmitted over a telecommunications network; a media access control (MAC) module; and a PHY module comprising a non-disruptive processor that: determines, for each of a plurality of the symbols, an estimated noise value associated with the respective symbol through a correlation of a log-likelihood ratio (LLR) value to predetermined noise values; and generates noise information representing time and frequency characteristics of noise in the telecommunications network.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
receiving, over a hybrid fiber coaxial network, a digital signal that includes a number of symbols;
determining, for each of a plurality of the symbols included in the digital signal, an estimated noise value associated with the respective symbol through a correlation of a log-likelihood ratio (LLR) value to predetermined noise values; and
generating, using the estimated noise values for the plurality of symbols included in the digital signal, a two-dimensional noise matrix representing time and frequency characteristics of noise in the hybrid fiber coaxial network.

2. The method of claim 1, further comprising:
computing averages of the estimated noise values over both time and frequency to generate the two-dimensional noise matrix.

3. The method of claim 2, further comprising:
computing moving averages of the estimated noise values over both time and frequency.

4. The method of claim 1, further comprising:
exporting the two-dimensional noise matrix from a PHY module to a media access control (MAC) module of a cable modem termination system.

5. The method of claim 1, wherein determining an estimated noise value associated with a symbol comprises:
calculating an LLR value for a plurality of bits within an interval of the signal;
computing a scalar value that relates to a statistical distribution of the calculated LLR values; and
using a predetermined correlation between the scalar value and symbol noise to determine the estimated noise value.

6. The method of claim 5, wherein the interval of the signal comprises a plurality of symbols each having a least significant bit and a second least significant bit, and wherein calculating an LLR value for a plurality of bits comprises:
calculating an LLR value for either the least significant bit or the second least significant bit of the symbols, or for both the least significant bit and the second least significant bit of the symbols.

7. The method of claim 5, wherein computing a scalar value that relates to a statistical distribution of the calculated LLR values comprises:
calculating a standard deviation of the calculated LLR values.

8. The method of claim 6, wherein determining the estimated noise value for the symbol based on a predetermined correlation comprises:
using the standard deviation of the LLR values as an index into a stored lookup table that correlates the noise within the received interval of the signal to the standard deviation of the calculated LLR values.

9. An apparatus comprising:
an interface unit that receives a digital signal, wherein the digital signal includes a number of symbols transmitted over a cable network; and
a processor coupled to the interface unit, that:
determines, for each of a plurality of the symbols included in the digital signal, an estimated noise value associated with the respective symbol through a correlation of a log-likelihood ratio (LLR) value to predetermined noise values; and
generates, using the estimated noise values for the plurality of symbols included in the digital signal, a two-dimensional noise matrix representing time and frequency characteristics of noise in the cable network.

10. The apparatus of claim 9, wherein the processor computes averages of the estimated noise values over both time and frequency to generate the two-dimensional noise matrix.

11. The apparatus of claim 10, wherein the processor computes moving averages of the estimated noise values over both time and frequency.

12. The apparatus of claim 9, wherein the processor exports the two-dimensional noise matrix from a PHY module to a media access control (MAC) module.

13. The apparatus of claim 9, wherein to determine an estimated noise value associated with a symbol, the processor:
calculates an LLR value for a plurality of bits within an interval of the signal;
computes a scalar value that relates to a statistical distribution of the calculated LLR values; and
uses a predetermined correlation between the scalar value and symbol noise to determine the estimated noise value.

14. The apparatus of claim 13, wherein the interval of the signal comprises a plurality of symbols each having a least significant bit and a second least significant bit, and wherein to calculate an LLR value for a plurality of bits, the processor:
calculates an LLR value for either the least significant bit or the second least significant bit of the symbols, or for both the least significant bit and the second least significant bit of the symbols.

15. The apparatus of claim 14, wherein to compute a scalar value that relates to a statistical distribution of the calculated LLR values the processor calculates a standard deviation of the calculated LLR values.

16. The apparatus of claim 15, wherein to determine the estimated noise value for the symbol based on a predetermined correlation the processor uses the standard deviation of the LLR values as an index into a stored lookup table that correlates the noise within the received interval of the signal to the standard deviation of the calculated LLR values.

17. An apparatus comprising:
an interface that receives, over a cable network, a digital signal that includes a number of symbols;
a media access control (MAC) module; and
a PHY module that:
determines, for each of a plurality of the symbols included in the digital signal, an estimated noise value associated with the respective symbol through a correlation of a log-likelihood ratio (LLR) value to predetermined noise values; and
generates, using the estimated noise values for the plurality of symbols included in the digital signal, a two-dimensional noise matrix representing time and frequency characteristics of noise in the cable network.

18. The apparatus of claim 17, wherein the PHY module exports the two-dimensional noise matrix to the MAC module.

19. The apparatus of claim 17, wherein to generate an estimated noise value associated with a symbol, the PHY module:
calculates an LLR value for a plurality of bits within an interval of the signal;
computes a scalar value that relates to a statistical distribution of the calculated LLR values; and
uses a predetermined correlation between the scalar value and symbol noise to determine the estimated noise value.

20. The apparatus of claim 19, wherein the interval of the signal comprises a plurality of symbols each having a least significant bit and a second least significant bit, and wherein to calculate an LLR value for a plurality of bits, the PHY module calculates an LLR value for either the least significant bit or the second least significant bit of the symbols, or for both the least significant bit and the second least significant bit of the symbols.

21. The apparatus of claim 20, wherein to compute a scalar value that relates to a statistical distribution of the calculated LLR values, the PHY module calculates a standard deviation of the calculated LLR values.

22. The apparatus of claim 21, wherein to determine the estimated noise value for the symbol based on a predetermined correlation, the PHY module uses the standard deviation of the LLR values as an index into a stored lookup table that correlates the noise within the received interval of the signal to the standard deviation of the calculated LLR values.

23. The apparatus of 17, wherein the PHY module computes averages of the estimated noise values over both time and frequency to generate the two-dimensional noise matrix.

24. The apparatus of claim 23, wherein PHY module computes moving averages of the estimated noise values over both time and frequency.

\* \* \* \* \*